(12) United States Patent
Blum et al.

(10) Patent No.: US 7,588,332 B2
(45) Date of Patent: Sep. 15, 2009

(54) ENHANCED ELECTRO-ACTIVE LENS SYSTEM

(75) Inventors: Ronald Blum, Roanoke, VA (US);
William Kokonaski, Gig Harbor, WA (US); Dwight P. Duston, Laguna Niguel, CA (US)

(73) Assignee: Pixel Optics, Roanoke, VA (US)

( * ) Notice: Subject to any disclaimer, the term of this patent is extended or adjusted under 35 U.S.C. 154(b) by 0 days.

(21) Appl. No.: 11/968,097

(22) Filed: Dec. 31, 2007

(65) Prior Publication Data

US 2008/0174732 A1      Jul. 24, 2008

Related U.S. Application Data

(63) Continuation of application No. 11/703,716, filed on Feb. 8, 2007, now Pat. No. 7,374,283, which is a continuation of application No. 10/918,496, filed on Aug. 13, 2004, now Pat. No. 7,195,353.

(60) Provisional application No. 60/566,406, filed on Apr. 30, 2004, provisional application No. 60/552,198, filed on Mar. 12, 2004, provisional application No. 60/544,964, filed on Feb. 17, 2004, provisional application No. 60/523,674, filed on Nov. 21, 2003, provisional application No. 60/511,128, filed on Oct. 15, 2003, provisional application No. 60/502,630, filed on Sep. 15, 2003, provisional application No. 60/495,110, filed on Aug. 15, 2003.

(51) Int. Cl.
*G02C 7/02* (2006.01)
(52) U.S. Cl. ............................ 351/159; 351/41; 351/168
(58) Field of Classification Search .................. 351/159, 351/41
See application file for complete search history.

(56) References Cited

U.S. PATENT DOCUMENTS

| | | | |
|---|---|---|---|
| 2,437,642 | A | 3/1948 | Henroleau |
| 2,576,581 | A | 11/1951 | Edwards |

(Continued)

FOREIGN PATENT DOCUMENTS

CN        89113088        10/2001

(Continued)

OTHER PUBLICATIONS

Kowel, Stephen T., et al.; Focusing by electrical modulation of refraction in a liquid crystal cell; Applied Optics; Jan. 15, 1984; vol. 23, No. 2.

(Continued)

*Primary Examiner*—Jordan M. Schwartz
(74) *Attorney, Agent, or Firm*—Townsend and Townsend and Crew LLP

(57) ABSTRACT

A lens system and optical devices that provide enhanced vision correction are disclosed. The lens system includes an electro-active layer that provides correction of at least one higher order aberration. The higher order correction changes dynamically based on a user of the lens system's needs, such as a change by the user's gaze distance, pupil size, or changes in tear film following blinking, among others. Optical devices are also described that use these and other lens systems to provide correction of higher order aberrations. An optical guide is also described that guides the user's line of sight to see through a lens region having a correction for a higher order aberration.

9 Claims, 12 Drawing Sheets

U.S. PATENT DOCUMENTS

| | | | |
|---|---|---|---|
| 3,161,718 A | 12/1964 | De Luca | |
| 3,245,315 A | 4/1966 | Marks et al. | |
| 3,309,162 A | 3/1967 | Kosanke et al. | |
| 3,614,215 A | 10/1971 | Mackta | |
| 3,738,734 A | 6/1973 | Tait et al. | |
| 3,791,719 A | 2/1974 | Kratzer et al. | |
| 4,174,156 A | 11/1979 | Glorieux | |
| 4,181,408 A | 1/1980 | Senders | |
| 4,190,330 A | 2/1980 | Berreman | |
| 4,264,154 A | 4/1981 | Petersen | |
| 4,279,474 A * | 7/1981 | Belgorod | 349/13 |
| 4,300,818 A | 11/1981 | Schachar | |
| 4,309,095 A | 1/1982 | Buckley | |
| 4,365,871 A | 12/1982 | Muchel | |
| 4,373,218 A | 2/1983 | Schachar | |
| 4,395,736 A | 7/1983 | Fraleux | |
| 4,418,990 A | 12/1983 | Gerber | |
| 4,422,733 A | 12/1983 | Kikuchi et al. | |
| 4,423,929 A | 1/1984 | Gomi | |
| 4,457,585 A | 7/1984 | DuCorday | |
| 4,466,703 A | 8/1984 | Nishimoto | |
| 4,466,706 A | 8/1984 | Lamothe, II | |
| 4,529,268 A | 7/1985 | Brown | |
| 4,564,267 A | 1/1986 | Nishimoto | |
| 4,572,616 A | 2/1986 | Kowel et al. | |
| 4,577,928 A | 3/1986 | Brown | |
| 4,601,545 A * | 7/1986 | Kern | 349/200 |
| 4,609,824 A | 9/1986 | Munier et al. | |
| 4,712,870 A | 12/1987 | Robinson et al. | |
| 4,756,605 A | 7/1988 | Okada et al. | |
| 4,772,094 A | 9/1988 | Sheiman | |
| D298,250 S | 10/1988 | Kildall | |
| 4,787,733 A | 11/1988 | Silva | |
| 4,787,903 A | 11/1988 | Grendahl | |
| 4,795,248 A | 1/1989 | Okada et al. | |
| 4,813,777 A | 3/1989 | Rainville et al. | |
| 4,818,095 A | 4/1989 | Takeuchi | |
| 4,836,652 A | 6/1989 | Oishi et al. | |
| 4,842,400 A | 6/1989 | Klein | |
| 4,880,300 A | 11/1989 | Payner et al. | |
| 4,890,903 A | 1/1990 | Treisman et al. | |
| 4,904,063 A | 2/1990 | Okada et al. | |
| 4,907,860 A | 3/1990 | Noble | |
| 4,909,626 A | 3/1990 | Purvis et al. | |
| 4,919,520 A | 4/1990 | Okada et al. | |
| 4,921,728 A | 5/1990 | Takiguchi | |
| 4,927,241 A | 5/1990 | Kuijk | |
| 4,929,865 A | 5/1990 | Blum | |
| 4,930,884 A | 6/1990 | Tichenor et al. | |
| 4,944,584 A | 7/1990 | Maeda et al. | |
| 4,945,242 A | 7/1990 | Berger et al. | |
| 4,952,788 A | 8/1990 | Berger et al. | |
| 4,958,907 A | 9/1990 | Davis | |
| 4,961,639 A | 10/1990 | Lazarus | |
| 4,968,127 A | 11/1990 | Russell et al. | |
| 4,981,342 A | 1/1991 | Fiala | |
| 4,991,951 A | 2/1991 | Mizumo et al. | |
| 5,015,086 A | 5/1991 | Okaue et al. | |
| 5,030,882 A | 7/1991 | Solero | |
| 5,050,981 A | 9/1991 | Roffman | |
| 5,066,301 A | 11/1991 | Wiley | |
| 5,067,795 A | 11/1991 | Senatore | |
| 5,073,021 A | 12/1991 | Marron | |
| 5,076,665 A | 12/1991 | Petersen | |
| 5,089,023 A | 2/1992 | Swanson | |
| 5,091,801 A | 2/1992 | Ebstein | |
| 5,108,169 A | 4/1992 | Mandell | |
| 5,114,628 A | 5/1992 | Hofer et al. | |
| 5,130,856 A | 7/1992 | Tichenor et al. | |
| 5,142,411 A | 8/1992 | Fiala | |
| 5,150,234 A | 9/1992 | Takahasi et al. | |
| 5,171,266 A | 12/1992 | Wiley et al. | |
| 5,182,585 A | 1/1993 | Stoner | |
| 5,184,156 A | 2/1993 | Black et al. | |
| 5,200,859 A | 4/1993 | Payner et al. | |
| 5,208,688 A | 5/1993 | Fergason et al. | |
| 5,229,797 A | 7/1993 | Futhey et al. | |
| 5,229,885 A | 7/1993 | Quaglia | |
| 5,231,430 A | 7/1993 | Kohayakawa | |
| 5,239,412 A | 8/1993 | Naka et al. | |
| D342,063 S | 12/1993 | Howitt et al. | |
| 5,306,926 A | 4/1994 | Yonemoto | |
| 5,324,930 A | 6/1994 | Jech, Jr. | |
| D350,342 S | 9/1994 | Sack | |
| 5,352,886 A | 10/1994 | Kane | |
| 5,359,444 A * | 10/1994 | Piosenka et al. | 349/13 |
| 5,375,006 A | 12/1994 | Haas | |
| 5,382,986 A | 1/1995 | Black et al. | |
| 5,386,308 A | 1/1995 | Michel et al. | |
| 5,424,927 A | 6/1995 | Schaller et al. | |
| 5,440,357 A | 8/1995 | Quaglia | |
| 5,443,506 A | 8/1995 | Garabet | |
| 5,451,766 A | 9/1995 | Van Berkel | |
| 5,488,439 A | 1/1996 | Weltmann | |
| 5,522,323 A | 6/1996 | Richard | |
| 5,552,841 A | 9/1996 | Gallorini et al. | |
| 5,608,567 A | 3/1997 | Grupp | |
| 5,615,588 A | 4/1997 | Gottschald | |
| 5,654,786 A * | 8/1997 | Bylander | 351/49 |
| 5,666,234 A | 9/1997 | Ohno | |
| 5,668,620 A | 9/1997 | Kurtin et al. | |
| 5,682,223 A | 10/1997 | Menezes et al. | |
| 5,683,457 A | 11/1997 | Gupta et al. | |
| RE35,691 E | 12/1997 | Theirl et al. | |
| 5,712,721 A | 1/1998 | Large | |
| 5,728,155 A | 3/1998 | Anello et al. | |
| 5,739,959 A | 4/1998 | Quaglia | |
| 5,777,719 A | 7/1998 | Williams et al. | |
| 5,805,266 A | 9/1998 | Gupta et al. | |
| 5,815,233 A | 9/1998 | Morokawa et al. | |
| 5,815,239 A | 9/1998 | Chapman et al. | |
| 5,861,936 A | 1/1999 | Sorensen | |
| 5,877,876 A | 3/1999 | Birdwell | |
| 5,900,720 A | 5/1999 | Kallman et al. | |
| 5,949,521 A | 9/1999 | Williams et al. | |
| 5,953,098 A | 9/1999 | Lieberman et al. | |
| 5,956,183 A | 9/1999 | Epstein et al. | |
| 5,963,300 A | 10/1999 | Horwitz | |
| 5,971,540 A | 10/1999 | Ofner | |
| 5,980,037 A | 11/1999 | Conway | |
| 5,999,328 A | 12/1999 | Kurtin et al. | |
| 6,040,947 A | 3/2000 | Kurtin et al. | |
| 6,050,687 A | 4/2000 | Bille et al. | |
| 6,069,742 A | 5/2000 | Silver | |
| 6,086,204 A | 7/2000 | Magnante | |
| 6,095,651 A | 8/2000 | Williams et al. | |
| 6,099,117 A | 8/2000 | Gregory | |
| 6,115,177 A | 9/2000 | Vossler | |
| 6,145,987 A | 11/2000 | Baude et al. | |
| 6,188,525 B1 | 2/2001 | Silver | |
| 6,191,881 B1 | 2/2001 | Tajima | |
| 6,213,602 B1 | 4/2001 | Smarto | |
| 6,270,220 B1 | 8/2001 | Keren | |
| 6,271,915 B1 | 8/2001 | Frey et al. | |
| 6,305,802 B1 | 10/2001 | Roffman et al. | |
| 6,325,508 B1 | 12/2001 | Decreton et al. | |
| 6,350,031 B1 | 2/2002 | Lashkari et al. | |
| 6,396,622 B1 | 5/2002 | Alden | |
| 6,437,762 B1 | 8/2002 | Birdwell | |
| 6,437,925 B1 | 8/2002 | Nishioka | |
| 6,464,355 B1 | 10/2002 | Gil | |
| 6,464,363 B1 | 10/2002 | Nishioka et al. | |
| 6,491,394 B1 | 12/2002 | Blum et al. | |
| 6,501,443 B1 | 12/2002 | McMahon | |

| | | |
|---|---|---|
| 6,554,425 B1 | 4/2003 | Roffman et al. |
| 6,603,443 B1 | 8/2003 | Hildebrand et al. |
| 6,609,794 B2 | 8/2003 | Levine |
| 6,614,408 B1 | 9/2003 | Mann |
| 6,616,275 B1 | 9/2003 | Dick et al. |
| 6,616,279 B1 | 9/2003 | Davis et al. |
| 6,618,208 B1 | 9/2003 | Silver |
| 6,626,532 B1 | 9/2003 | Nishioka et al. |
| 6,631,001 B2 | 10/2003 | Kuiseko |
| 6,682,195 B2 | 1/2004 | Dreher |
| 6,709,108 B2 | 3/2004 | Levine et al. |
| 6,738,199 B2 | 5/2004 | Nishioka |
| 6,768,536 B2 | 7/2004 | Okuwaki et al. |
| 6,774,871 B2 | 8/2004 | Birdwell |
| 6,778,246 B2 | 8/2004 | Sun et al. |
| 6,833,938 B2 | 12/2004 | Nishioka |
| 6,836,371 B2 | 12/2004 | Lai et al. |
| 6,840,619 B2 | 1/2005 | Dreher |
| 6,851,805 B2 | 2/2005 | Blum et al. |
| 6,893,124 B1 | 5/2005 | Kurtin |
| 6,918,670 B2 | 7/2005 | Blum et al. |
| 6,948,818 B2 | 9/2005 | Williams et al. |
| 6,951,391 B2 | 10/2005 | Morris et al. |
| 6,986,579 B2 | 1/2006 | Blum et al. |
| 7,008,054 B1 | 3/2006 | Kurtin et al. |
| 7,009,757 B2 | 3/2006 | Nishioka et al. |
| 7,019,890 B2 | 3/2006 | Meredith et al. |
| 7,085,065 B2 | 8/2006 | Silver |
| 7,133,172 B2 | 11/2006 | Nishioka |
| 7,195,353 B2 * | 3/2007 | Blum et al. .................. 351/159 |
| 2002/0140899 A1 | 10/2002 | Blum et al. |
| 2002/0149739 A1 | 10/2002 | Perrott et al. |
| 2002/0186346 A1 | 12/2002 | Stantz et al. |
| 2003/0018383 A1 * | 1/2003 | Azar ......................... 623/6.22 |
| 2003/0151721 A1 | 8/2003 | Lai et al. |
| 2003/0210377 A1 | 11/2003 | Blum et al. |
| 2004/0008319 A1 | 1/2004 | Lai et al. |
| 2004/0108971 A1 | 6/2004 | Waldern et al. |
| 2004/0117011 A1 | 6/2004 | Aharoni et al. |
| 2004/0130677 A1 | 7/2004 | Liang et al. |
| 2004/0179280 A1 | 9/2004 | Nishioka |
| 2004/0196435 A1 | 10/2004 | Dick et al. |
| 2004/0233385 A1 | 11/2004 | Kitani et al. |
| 2004/0246440 A1 | 12/2004 | Andino et al. |
| 2005/0073739 A1 | 4/2005 | Meredith et al. |
| 2005/0124983 A1 | 6/2005 | Frey et al. |
| 2005/0260388 A1 | 11/2005 | Lai |
| 2006/0044510 A1 | 3/2006 | Williams et al. |
| 2007/0216863 A1 | 9/2007 | Menezes |

FOREIGN PATENT DOCUMENTS

| | | |
|---|---|---|
| DE | 42223395 | 1/1994 |
| EP | 0154962 | 9/1985 |
| EP | 023310 | 8/1987 |
| EP | 0237365 | 9/1987 |
| GB | 2170613 | 8/1986 |
| GB | 2169417 | 7/1987 |
| JP | 55-076323 | 6/1980 |
| JP | 1237610 | 9/1989 |
| JP | 05 100201 | 4/1993 |
| JP | 11-352445 | 12/1998 |
| WO | WO 92/01417 | 2/1992 |
| WO | WO 98/27863 | 7/1998 |
| WO | WO 99/27334 | 6/1999 |
| WO | WO 03/050472 | 6/2003 |
| WO | WO 03/050473 | 6/2003 |
| WO | WO 03/068059 | 8/2003 |
| WO | WO 2004/008189 | 1/2004 |
| WO | WO 2004/015481 | 2/2004 |
| WO | WO 2004/034095 | 4/2004 |
| WO | WO 2004/072687 | 8/2004 |

OTHER PUBLICATIONS

Davis, Robert A.; Computer Vision Syndrome- The Eyestrain Epidemic; Review of Optometry, Sep. 15, 1997.

Lazarus, Stuart M.; The Use of Yoked Base-Up and Base-In Prism for Reducing Eye Strain at the Computer; Journal of the American Optometric Association, Apr. 1996.

Eyecare Business, Oct. 1997.

Thibos, Larry N., et al.; Vision through a liquid-crystal spatial light modulator, InPress, Adaptive Optics Conference; 1999; Durham, UK.

Thibos, Larry N., et al.; Requirements for Segmented Spatial Light Modulators For Diffraction-Limited Imaging Through Aberrated Eyes, InPress, Adaptive Optics Conference, Durham, UK, 1999.

Thibos, Larry N., et al.; Use of Liquid-Crystal Adaptive-Optics to Alter the Refractive State of the Eye; Opometry and Vision Science; Jul. 1997; vol. 74, No. 7; American Academy of Optometry.

Thibos, Larry N., et al.; Electronic Spectacles for the 21$^{st}$ Century, Indian Journal of Optometry, Spring 1999; vol. 2, No. 1.

Bradley, Arthur; Profile: Larry N. Thibos, PhD., and Donald T. Miller, PhD.; Indiana Journal of Optometry; Spring 1999; vol. 2, No. 1, p. 1 only.

Naumov, A.F.; Control Optimization of Spherical Model Liquid Crystal Lenses; Optics Express, Apr. 26, 1999; vol. 4, No. 9; Optical Society of America.

Naumov, A. F.; Liquid Crystal Adaptive Lenses with Model Control; Optics Letters, Jul. 1, 1998, vol. 23, No. 13; Optical Society of America.

Liquid Lenses Eye Commercial Breakthrough; (Internet Article under Optics.org) Opto & Laser, Nov. 2003.

Anderson, M.; Adaptive Optics: Liquid Crystals Lower the Cost of Adaptive Optics; Laser Focus World, Dec. 1999.

* cited by examiner

ENHANCED ELECTRO-ACTIVE LENS SYSTEM

RELATED APPLICATIONS

The present application is a continuation of Ser. No. 11/703,716, filed on Feb. 8, 2007, now U.S. Pat. No. 7,373,283, which is turn a continuation of Ser. No. 10/918,496, filed Aug. 13, 2004, now U.S. Pat. No. 7,195,353, which, in turn, claims priority to U.S. Provisional Application No. 60/495,110, filed Aug. 15, 2003; No. 60/502,630, filed Sep. 15, 2003; No. 60/511,128, filed Oct. 15, 2003; No. 60/523,674, filed Nov. 21, 2003; No. 60/544,964 filed Feb. 17, 2004, No. 60/552,198, filed Mar. 12, 2004, and No. 60/566,406 filed Apr. 30, 2004. All of the foregoing applications are hereby incorporated by reference in their entirety.

BACKGROUND OF THE INVENTION

Many people, even those with otherwise good vision, have minor vision deficiencies that fall under the category of non-conventional refractive error that prevent them from achieving the best visual acuity possible. Unlike conventional refractive error, i.e. "nearsightedness" or "far-sightedness" and other types of problems usually addressed in persons with corrected vision, the impact of unconventional refractive error, such as higher order aberrations, may even be difficult for an individual to perceive until it has been identified, measured and corrected during an eye exam and the individual has an opportunity to realize the increased visual acuity that accompanies correction of these errors.

The effect of higher order aberrations may vary depending on environmental conditions, such as distance from an object being viewed or the size of the pupil, which fluctuates based on the distance viewed and the amount of ambient light entering the pupil. Thus, a lens that has a fixed correction for higher order aberrations may still not provide an individual a proper correction except under certain conditions.

SUMMARY OF THE INVENTION

Accordingly, it may be desirable to provide lens systems and optical devices that address these and other vision correction needs that permit dynamic changes in the higher order correction and/or which may assist in helping multiple persons with different higher order correction needs use the same optical device.

In accordance with an exemplary aspect of the invention, a lens system comprises a first electro-active layer that provides correction of at least one higher order aberration; the provided higher order correction dynamically changes in response to a user's needs while looking through the lens system. The dynamic changes may be based, for example, in a response to a change in the user's gaze, the user's pupil size, or the elapsed time after a blink.

In accordance with another exemplary aspect of the invention, an optical device comprises at least one lens to correct higher order aberrations. The lens may be integrated with or removably attached to the optical device, and may include additional features that make the optical devices particularly suitable for use by multiple persons, especially in rugged and/or military environments.

Additional aspects, features and advantages of the present invention will be more apparent when considered in light of the following detailed description of exemplary embodiments of the invention.

DETAILED DESCRIPTION OF EXEMPLARY EMBODIMENTS

Figure 1A:
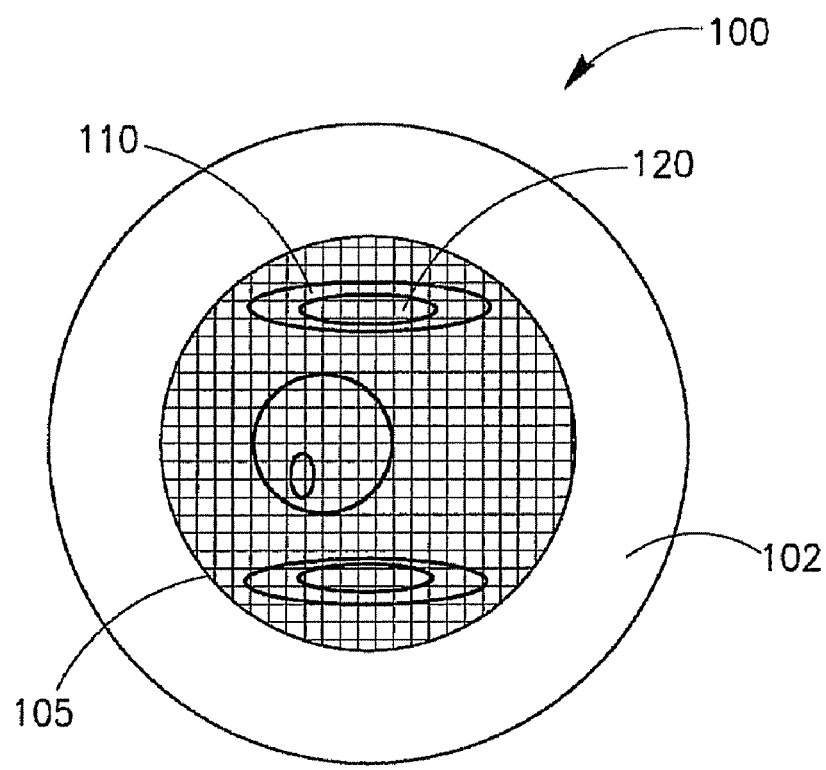
FIG. 1a is an illustration of an electro-active pixel pattern to correct for a higher order aberration under a given set of conditions.

Exemplary embodiments of the invention are directed to lens systems and optical devices using lens systems that provide enhanced vision capabilities.

As described in more detail in U.S. Pat. No. 6,619,799, incorporated herein by reference in its entirety, electro-active lenses have been developed that are capable of providing vision correction that corrects for both conventional refractive error, such as hyperopia and myopia, and that corrects for non-conventional refractive error, including higher order aberrations.

The benefits of correcting non-conventional refractive error in particular may provide an individual with a visual acuity that is better than 20/20. Non-conventional errors, particularly higher order aberrations, such as coma, for example, typically result from deficiencies within the eye and often prevent even those with good vision, i.e. 20/20, from improving visual acuity to a higher level such as 20/15, 20/10 or even approaching 20/8.

The effect of the higher order aberration on a person's vision may fluctuate based on the size of the pupil and or the gaze distance of the object being viewed. For example, as the pupil enlarges when ambient light is low or when gazing at a near object, a person may experience that the aberration has a greater or lesser effect on that person's vision than in high ambient light when the pupil is smaller or when gazing at a distant object. Changes in pupil size may also result from blinking, as well as changes from temperature, altitude, environmental conditions and even the emotional state of an individual.

In general, a smaller pupil provides a slightly sharper focus and covers some of the aberrations that may be present in the eye, which are typically located in the cornea or the crystalline lens, as well as other parts of the eye. In conditions where the pupil opens wider to admit more light, more of the aberrations are exposed and thus introduced into images created as light enters the eye. An increase in the impact of spherical aberrations may be particularly noticeable as pupil size increases.

Thus, an aberration that may have a substantial impact on vision when a pupil is dilated, such as in low light conditions, may have a different or lesser impact in bright light when the pupil is typically much smaller in size and limits the amount of light entering the eye. The light passes through a smaller area of the eye and thus may not pass through a portion of the eye subject to a particular deficiency, while other deficiencies may be exaggerated. As a result, a person may have a substantially constant base optical power in varying ambient light conditions, e.g., −2.50 Diopter (D), but may need two or more different prescriptions to correct higher order aberrations depending on the viewing conditions.

Likewise, a change in gaze distance may also result in a change in the aberrations of the eye. Generally, pupil size increases as one focuses on an object in a near distance range, typically less than about 18-24 inches from the eye. Additionally, the curvature of the crystalline lens of the eye also changes as gaze distance changes. The change in pupil size, along with a change in the crystalline lens curvature combine to alter the impact of an aberration as gaze distance varies. Convergence effects when viewing objects in a near distance range may also alter the impact of aberrations at different gaze distances.

According to exemplary embodiments of the invention, a lens system is provided that dynamically adjusts the higher order aberration correction to correlate with the pupil diameter and/or the gaze distance of one looking through the lens system. In this manner, the same lens that corrects an individual's higher order aberrations to provide improved visual acuity when the pupil is dilated also adjusts to maintain that level of visual acuity as the pupil contracts.

The lens system comprises an electro-active lens that has at least one layer of electro-active material, such as a liquid crystal for example, as described in the '799 patent. The layer of electro-active material is divided into a two dimensional array of pixels using a transparent insulator, such as indium tin oxide, for example, or other transparent insulating material. Each pixel is individually addressable so that an applied voltage causes the electro-active material in each pixel to take a certain molecular orientation. As light passes through the individual pixels, the light is refracted at a certain angle based on the indices of refraction resulting from the orientation of the electro-active material in particular pixels. By adjusting the voltage applied to each of the individual pixels, different pixels are oriented at different angles yielding different indices of refraction. In this way, the lens system can be controlled to refract light corresponding to a particular pattern to achieve a vision prescription that corrects the aberrations of a person's eye and yields a higher order correction across the entire eye when the individual views through the lens system.

Figure 14:
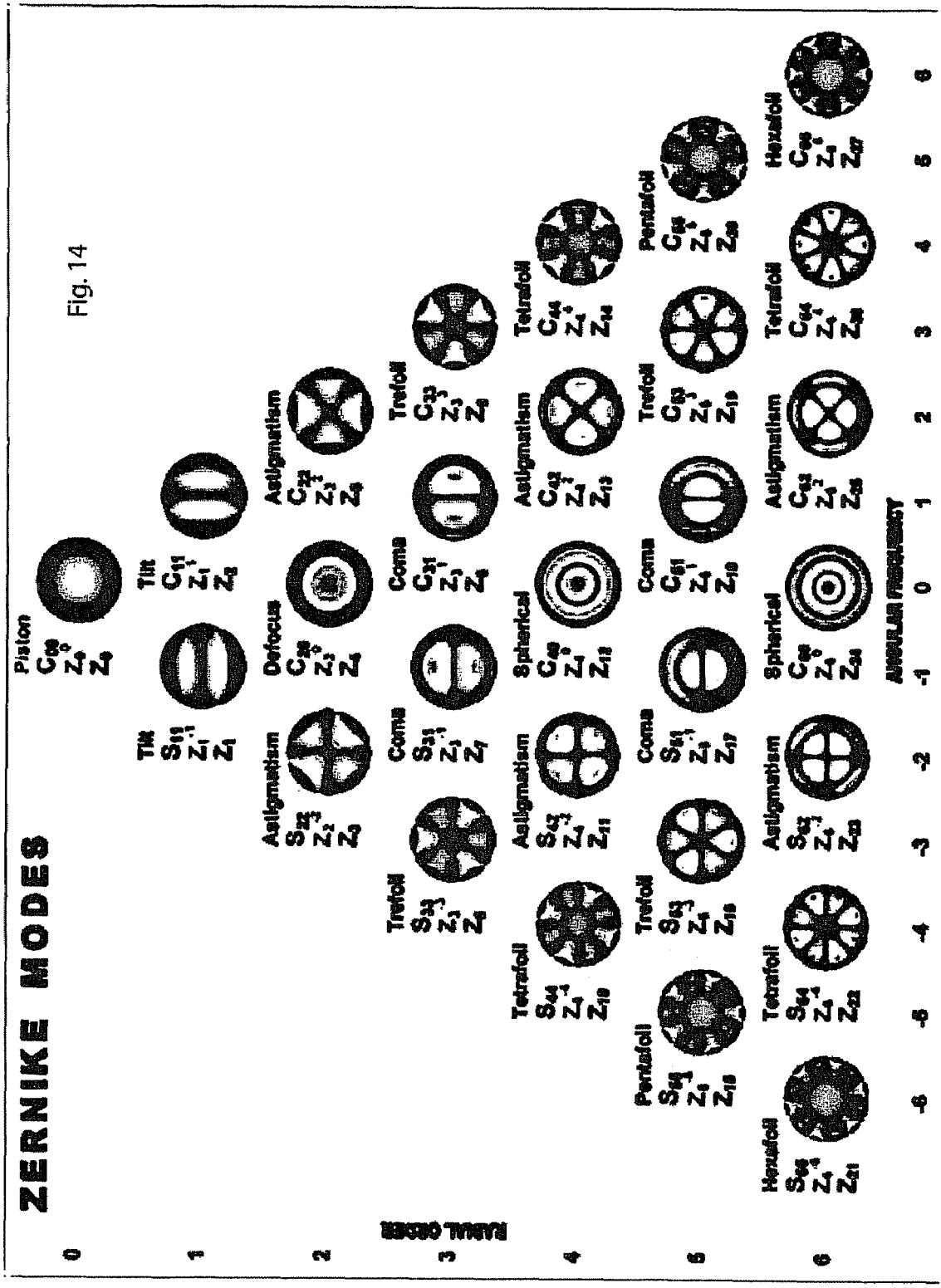
FIG. 14 is a Zernike mode chart illustrating exemplary higher order aberrations.

Higher order aberrations can be measured, for example, through the use of a wavefront analyzer to determine the pattern of optical power needed to provide higher order aberration correction. Wavefront analyzers measure the distortion of a plane light wave passing through the eye caused by aberrations and may be used to sense the location and magnitude of the aberrations in the eye. Exemplary types of higher order aberrations are shown in the Zernike chart shown at FIG. 14. The measured wavefront is then used to determine a vision prescription that may be electronically stored as a series of vision corrections in which different vision corrections may be needed for different areas of the eye.

As previously discussed, higher order aberrations typically vary depending on the gaze distance and pupil size. Accordingly, the wavefront may be measured under a variety of lighting conditions and at different gaze lengths. For example, measurements may typically be taken while an individual is gazing at a distance of 20 feet, corresponding to "far" vision, 2 to 3 feet, corresponding to "intermediate" vision, and distances up to about 18 to 24 inches, corresponding to "near" vision. More and/or different distances may be used to measure different levels of change in the higher order correction needed. Likewise, measurements are taken under at least bright and dim ambient light conditions, although a range of ambient light conditions may be used to determine how the higher order aberration changes from light to dark or vice versa.

Similar accommodations can be made for changes in the aberration correction that result from eye blinks. Higher order aberrations change after an eye blink due to tear spread over the cornea. This tear spread continues to change as a function of time after a blink and may depend upon several factors. Exemplary factors impacting rate of change of tear spread include consistency of the tear film, evaporation, drainage, and gravity.

For a specific individual the effect of the higher order aberration and thus the desired correction will continue to change over an elapsed period of time after a blink until the specific individual blinks again. Then, the higher order aberration correction cycle will repeat itself.

Using a wavefront analyzer, measurements of one's higher-order aberrations can be made just before a blink, just after a blink, and at specific intervals between blinks to determine how the aberrations fluctuate with blinking. Once measured, an eye care professional may determine whether one or more prescriptions following a blink to correct for the changing aberrations is desirable; these prescriptions may then be programmed into a microcontroller chip that drives the electro-active lens that provides the correction. When a blink occurs in the user's eye, detected by a photo-sensor or other such device, the microcontroller can alter the correction between one or more stored prescriptions to optimize the user's vision during the time interval after the blink.

By measuring and storing a prescription to correct higher order aberrations at various distances and ambient light intensities and or at different stages of tear film spread, a comprehensive set of prescriptions may be stored in an electronic memory associated with the lens system. The stored set of prescriptions for various viewing conditions, when used in combination with a sensor that detects such viewing conditions, may be used such that the lens system dynamically changes to provide and subsequently maintain a level of enhanced visual acuity as viewing conditions continue to change.

One such sensor that may be used is a photo-detector that monitors pupil diameter. As the photo-detector senses a change in pupil size, a controller adjusts voltage applied to the array of pixels of the lens system based on the measured pupil diameter to dynamically modify the prescription to provide the proper higher order aberration correction, permitting an individual looking through the lens system to maintain an enhanced level of visual acuity.

Another sensor that may used is a photo-sensor that detects reflection of light off the cornea of an eye. Each time an eye blinks, the lid interrupts the reflection of light from the cornea. This may cause a prescription to be displayed to the user corresponding to a certain tear film condition. The prescription may change as a function of time based on pre-measured effects of changes in the user's tear film until the user blinks again and the photo-sensor determines the prescription should be reset to the initial after-blink prescription.

In yet another embodiment of the invention, the sensor may measure ambient light rather than a change in pupil size per se. Based on previously measured pupil size under varying ambient light conditions, the higher order correction needed for the pupil size at those ambient light conditions may be displayed to the user.

An exemplary pixel pattern to correct higher order aberrations is shown in the lens 100 of FIG. 1*a*. The lens 100 includes a base lens 102 and a pixelated electro-active region 105. Based on particular aberrations of the eye under a certain set of conditions, such as bright light for example, a wavefront analyzer has previously measured that a particular correction is needed by a user for a particular area of the eye. Accordingly, a first region 110 of the pixelated electro-active region 105 is programmed to compensate for a deficiency corresponding to a portion of the wavefront passing through the eye corresponding to that area of the lens, while a different correction is needed at a second region 120 of the pixelated electro-active region 105 to compensate for a deficiency corresponding to a different portion of the eye.

Figure 1B:
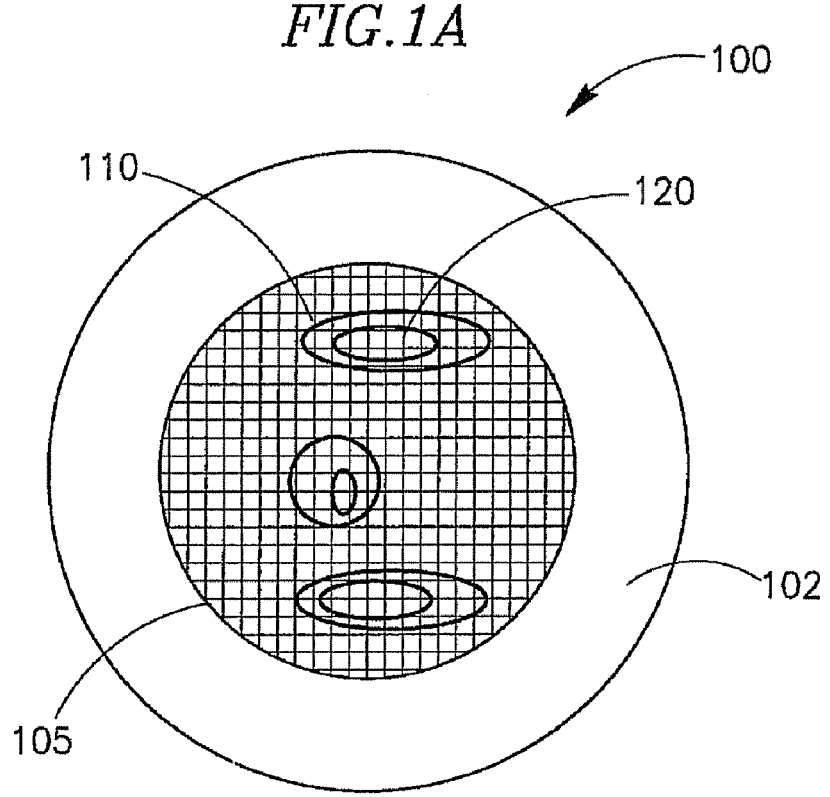
FIG. 1b is an illustration of an electro-active pixel pattern to correct for a higher order aberration under a different given set of conditions.

Depending on the individual and/or the conditions under which the individual's eye is measured, a variety of patterns may be obtained that change depending on the particular individual's needs. For example, the same individual, when the pupil is fully dilated, may require the vision correction prescription shown in FIG. 1*b* to maintain the enhanced level of visual acuity provided by the correction of higher order aberrations and which can be switched by a controller based on a signal received by a sensor (not shown) that monitors pupil size or other conditions that may result in a change in the higher order aberration correction needed.

It should be appreciated that in certain circumstances, a person may desire a lens that is machined with a fixed higher order aberration prescription. Measurements may be taken of the individual at various light intensities and gaze distances to determine an average higher order aberration prescription which may not provide the individual with the best visual acuity under all conditions but which may nonetheless represent a satisfactory solution. Conversely, if the conditions are predetermined, then the fixed correction can be designed for those particular conditions to maximize the effect of the correction.

Lens systems that correct higher order aberrations may also correct for conventional refractive error, for example, through additional layers of electro-active material or through a fixed focal length optic included with the lens system that provides spherical correction as further described in the '799 patent. The fixed focal length optic advantageously may be used to provide a fail safe mechanism when the higher order aberration correction is provided electro-actively. This may prevent the loss of distance vision in the event that electro-active vision correction fails during a task such as driving, etc. For example, in the event that a power loss or other malfunction results in a failure of one or more electro-active layers, the fixed focal length optic still provides the individual with sufficient vision correction to see until the malfunction can be repaired. Typically, the fixed focal length optic provides far field vision.

The fixed focal length optic may be used as a base lens to which the electro-active layer(s) is attached and may provide no optical power; i.e. 0 D. For example, if a fixed focal length optic is used as a foundation to which one or more layers of electro-active material are attached, a fixed optic with no optical power may used by people that only desire correction of higher order aberrations and either do not need conventional vision correction or choose to rely on an alternative method of vision correction such as contact lenses or laser surgery, for example.

Lens systems according to exemplary embodiments may advantageously be used in a variety of applications where enhanced visual acuity is desirable including spectacles and optical devices. One particularly advantageous use may be when the lens system is part of a goggle device for use by military personnel or others typically in rugged environments where enhanced visual acuity may be particularly desirable. The enhanced visual acuity may provide enhanced clarity for environment perception, communication, and/or target acquisition. For example, increased visual acuity may provide a soldier the ability to perceive an aircraft silhouette sooner and enable him to more quickly determine whether that silhouette represents a friendly or enemy aircraft and, thus, whether evasive action is needed.

Figure 2:
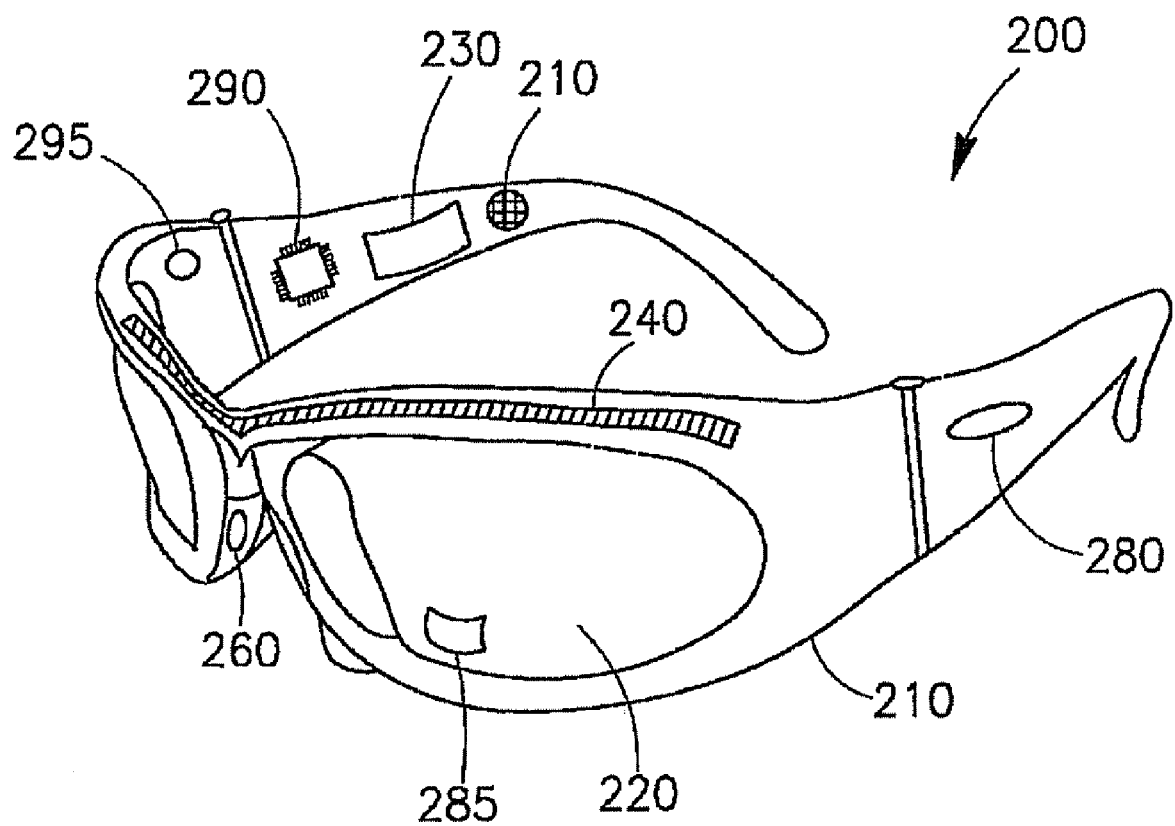
FIG. 2 is an illustration of goggles containing a lens system according to an exemplary embodiment of the invention.

An exemplary embodiment of goggles that correct for higher order aberrations is shown in FIG. 2. The goggles 200 include a frame 210 and a lens system 220 that corrects for higher order aberrations, and which may optionally also correct conventional refractive error. The goggles 200 may further include a power source, such as a battery 230. The battery 230 can be a thin strip battery that is lightweight and attaches to the frame 210 of the goggles 200. A solar strip 240 may serve as a primary or auxiliary power source, with excess power stored in the battery 230 to provide power when solar energy is insufficient to provide all of the requisite power. A sensor 295 measures pupil size to provide higher order aberration correction dynamically.

The lens system for use in goggles or other applications may be tinted or polarized to reduce eye strain and provide protection from the sun. Tinting may be accomplished, for example, through the use of a photochromic layer or an electrochromic layer that can be electrically adjusted to provide a desired level of tint depending on the intensity of brightness.

Referring again to FIG. 2, where the goggles 200 are intended for use in military operations, the goggles 200 may further include a microphone 260 and speaker 270 that, in combination with a transceiver 280, provide a hands-free communication system. The goggles 200 may also include a heads-up microdisplay 285 that assists a wearer with mapping and directions or other visual controls that may be useful. The lens system 220 along with the communication system and the heads-up microdisplay 285 may be controlled by a microchip 290 that produces the pixel pattern for the higher order aberration correction. The goggles 200 may further be adapted to communicate with a portable computer (not shown) either via hardwire or wireless signals that provides access to other applications, such as target acquisition, for example, that is displayed to the heads-up microdisplay 285.

When used in military operations, it may also be particularly desirable to protect a soldier's eyes from laser exposure, which may be one form of enemy attack. To provide this protection, lens systems according to exemplary embodiments of the invention may include a laser protection layer.

The laser protection layer may include a rugate filter. Rugate filters typically provide laser protection at specific frequencies. The laser protection layer may also be a layer of electro-active material of high non-linear susceptibility added to the lens system. This electro-active material does not provide for vision correction, but when activated by applying an electrical potential, has absorptive and/or reflective properties that provide laser protection for a wider range of frequencies than rugate filters. Examples of these types of materials include high "chi-2" or "chi-3" non-linear optical materials, such as lithium niobate, for example.

Figure 3:
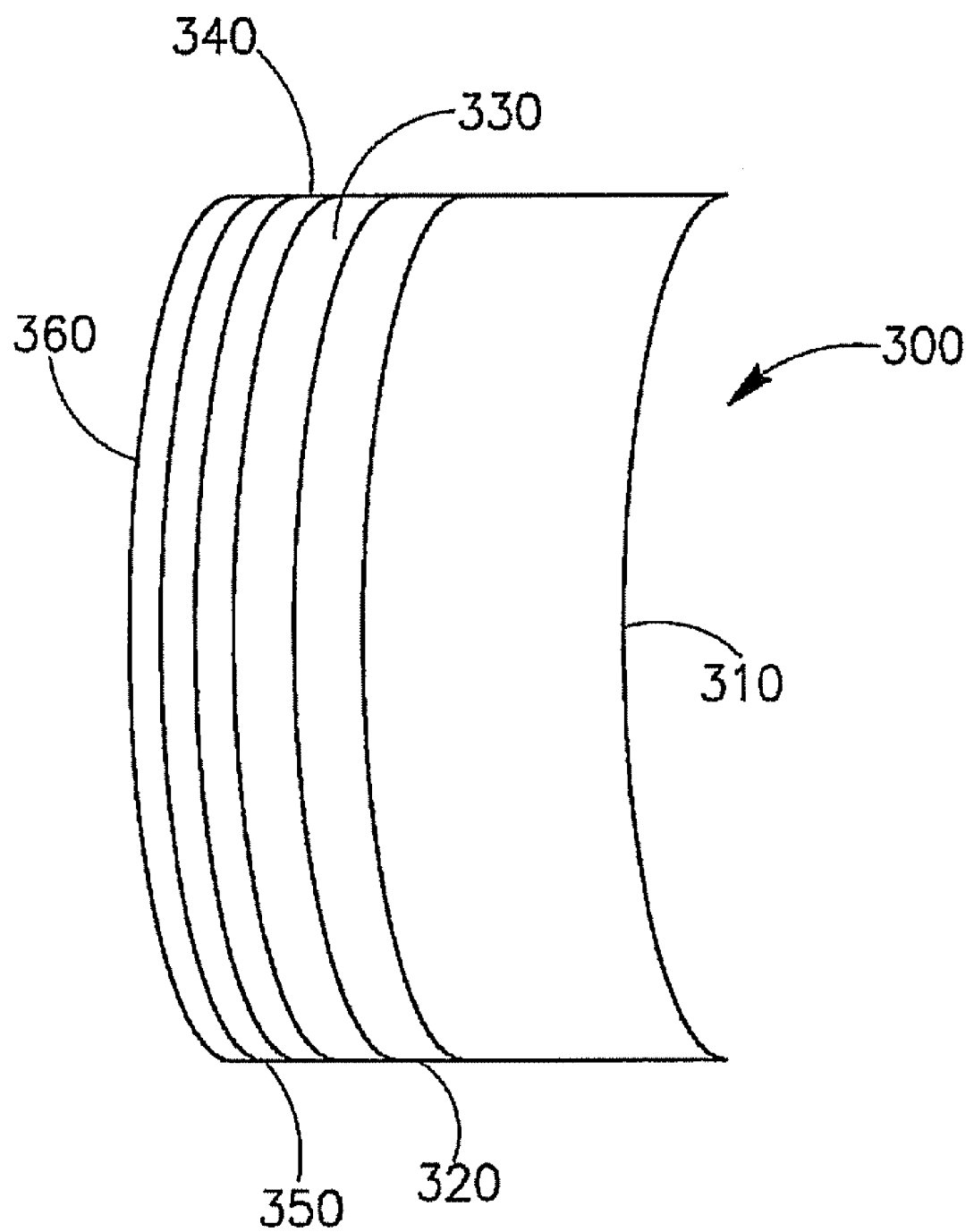
FIG. 3 is an illustration of a lens system according to an exemplary embodiment of the invention.

An exemplary embodiment of a lens system that includes laser protection is shown in a side view in FIG. 3. The lens system 300 includes a fixed distance optic 310 and an electro-active layer 320 that provides for the correction of higher order aberrations. The lens system additionally includes a laser protection layer 330 and an electrochromic layer 340. As shown in the lens system 300 of FIG. 3, a hard coat 350 may be applied as a protective layer over the electro-active layer 320 and any intervening layers. Also, an anti-reflective coating 360 is optionally applied which may reduce the amount of light lost due to reflection, which may improve the overall performance of the lens system 300.

Lens systems that correct for higher order aberrations may advantageously include a night vision module. The night vision module may be used with an electro-active lens system that provides dynamic correction of higher order aberrations or alternatively may be used with a lens system that provides a fixed correction of higher order aberrations. The addition of a night vision module to provide increased visual acuity at night may provide a strategic advantage for military personnel and others that desire or need to see in extremely low light or no light conditions. For example, a firefighter's face shield may include a correction for higher order aberrations along with a night vision or long wave infrared (IR) imaging module. This may provide the firefighter with the ability to more quickly perceive a person in need of rescue in a dark, smoky building than using night vision or thermal imaging alone, increasing response time and the likelihood of a successful rescue.

Night vision modules for use with lens systems according to exemplary embodiments of the invention typically use either a visible light photomultiplier tube or an IR detection system. IR-based night vision systems detect infrared energy from various emission sources, such as living organisms (typically in the 8-12 micron range). The IR energy is converted into a form that renders it for display on a screen, showing a visible contrast between different objects based on the amount of IR energy each object emits.

One infrared system that may be used includes a focal plane array that is a 2-dimensional layout of rows and columns of pixels, similar to the pixel array that provides the electro-active higher order aberration correction. The pixels of the night vision module include a material that is infrared sensitive. The material in each pixel absorbs infrared energy and based on the intensity of the infrared signals received, emits energy in a form that is measured and replicated on a screen. Suitable infrared sensitive materials for use in the night vision module may include ferroelectric material, platinum silicide, indium antimonide, gallium arsenide quantum wells, silicon extrinsically doped with arsenic, micro-bolometers, and other materials that exhibit quantifiable changes in energy when exposed to infrared energy.

Other methods of providing vision in low light situations in combination with the correction of higher order aberrations that may be included as part of a night vision module in accordance with exemplary embodiments of the invention include the use of an image intensifier device. When using these intensifier devices, light in the form of infrared or visible energy strikes a photoemitter plate. The plate emits electrons corresponding to the strength of the light signal, i.e. the stronger the light, the more electrons that are emitted from the photoemitter plate. The electrons pass as a beam though an image intensifier, typically a micro-channel plate that amplifies the electron beam. Once amplified, the electrons strike phosphors on a fluorescent screen and their energy is converted into visible photons.

Figure 4:
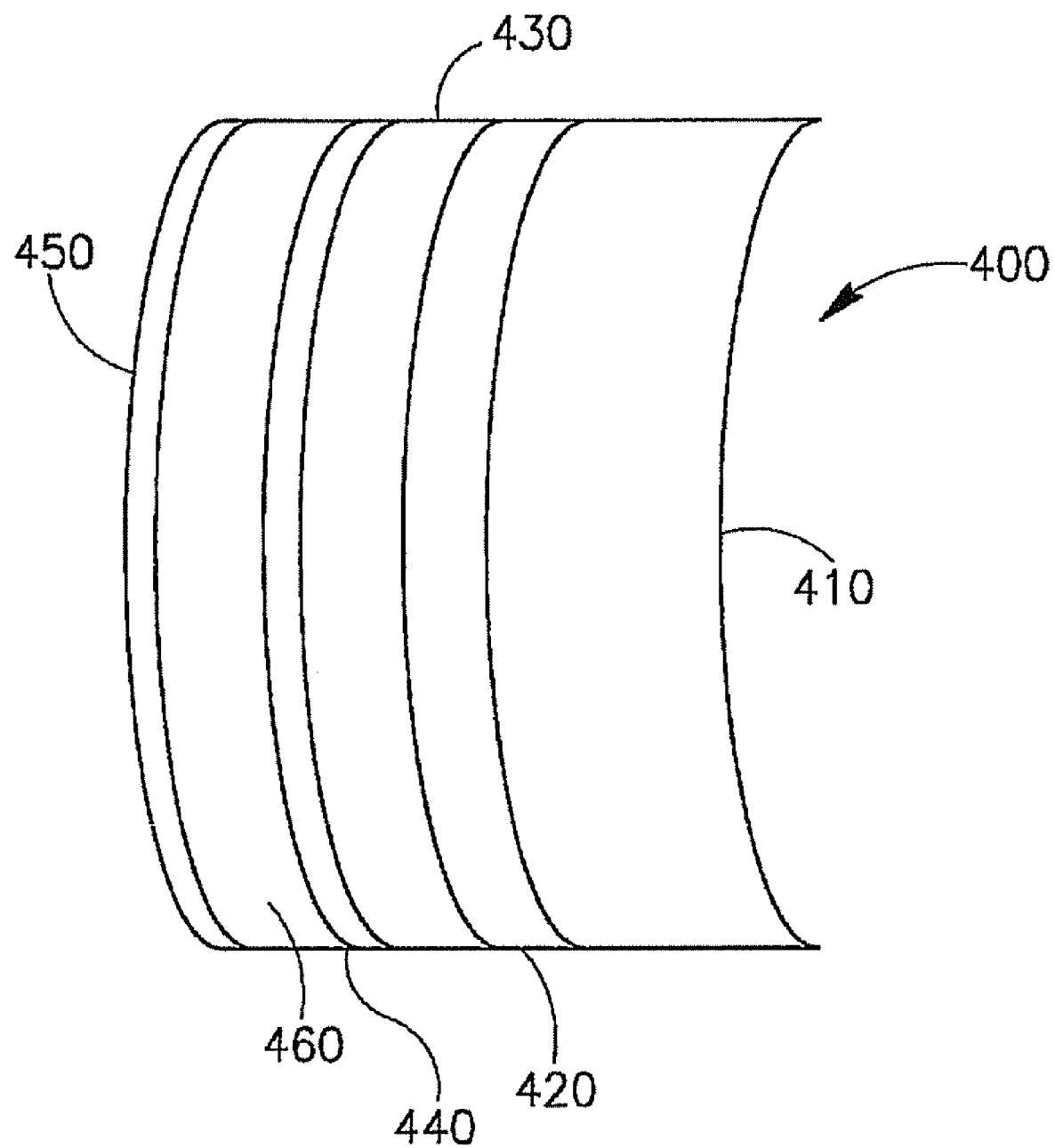
FIG. 4 is an illustration of a lens system according to another exemplary embodiment of the invention.

An exemplary embodiment of a lens system that includes a night vision module is shown in FIG. 4. The lens system 400 is similar to that described with respect to FIG. 3, with the addition of a night vision module 460 between the anti-reflective coating 450 and the hard coat 440. It should be appreciated that the night vision module may be at any position in the lens system 400 provided that the higher order aberration correcting layer 420 is between the night vision module 460 and the eye of a person viewing through the lens system 400.

In order to provide enhanced night vision that has a level of acuity similar to regular vision, the detectors and screens should have resolution comparable to the higher order lens, particularly where the higher order correcting lens is electro-active. For example, the pixel array that provides higher order aberration correction preferably has the same or fewer number of rows and columns than any other pixel array in the lens system, such as the night vision module. If the resolution of the night vision module or any other layer is less than the resolution provided by the higher order correcting layer, then the night vision module becomes a limiting factor and the full range of improved visual acuity possible with the correction of higher order aberrations may not be achieved. In embodiments in which the night vision module uses a photomultiplier tube, the higher-order aberration correction may be provided directly by the photomultiplier tube.

Exemplary embodiments of the invention are also directed to optical devices that include a lens system that corrects for higher order aberration. The lens systems of these optical devices are dissociated from a user's eye and typically are used in addition to any other vision correction device worn by the user, such as spectacles, contact lenses, etc. Dissociated optical devices typically provide a limited field-of-view, restricted to a small solid angle, usually centered on the optical axis of the eye. Dissociated optical devices include telescopes, ophthalmoscopes, binoculars, monoculars, rifle scopes, goggles, cameras, visors, faceshields, gun sights, microscopes, and bio-microscopes, by way of example only.

Figure 5:
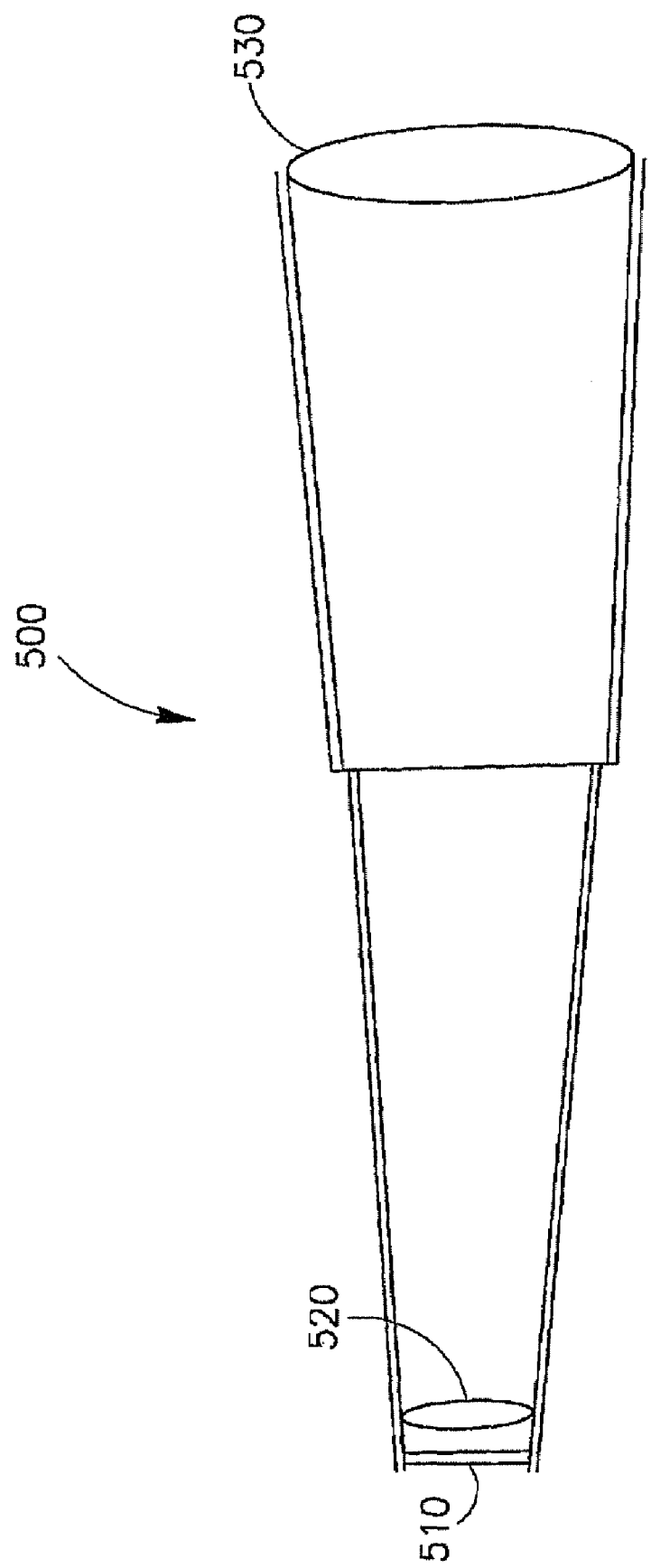
FIG. 5 is an illustration of an optical device using a higher order aberration correcting lens system according to an exemplary embodiment of the invention.

As shown in FIG. 5, one such dissociated optical device is a telescope 500. A higher order correcting lens 510 is positioned in front of the eyepiece 520 such that a user looking through the telescope 500 first views through the lens 510 that corrects for higher order aberrations. Put another way, light travels to the telescope user's eye first through the objective lens 530, then through the eyepiece 520 and finally through the higher order correcting lens 510.

Figure 6:
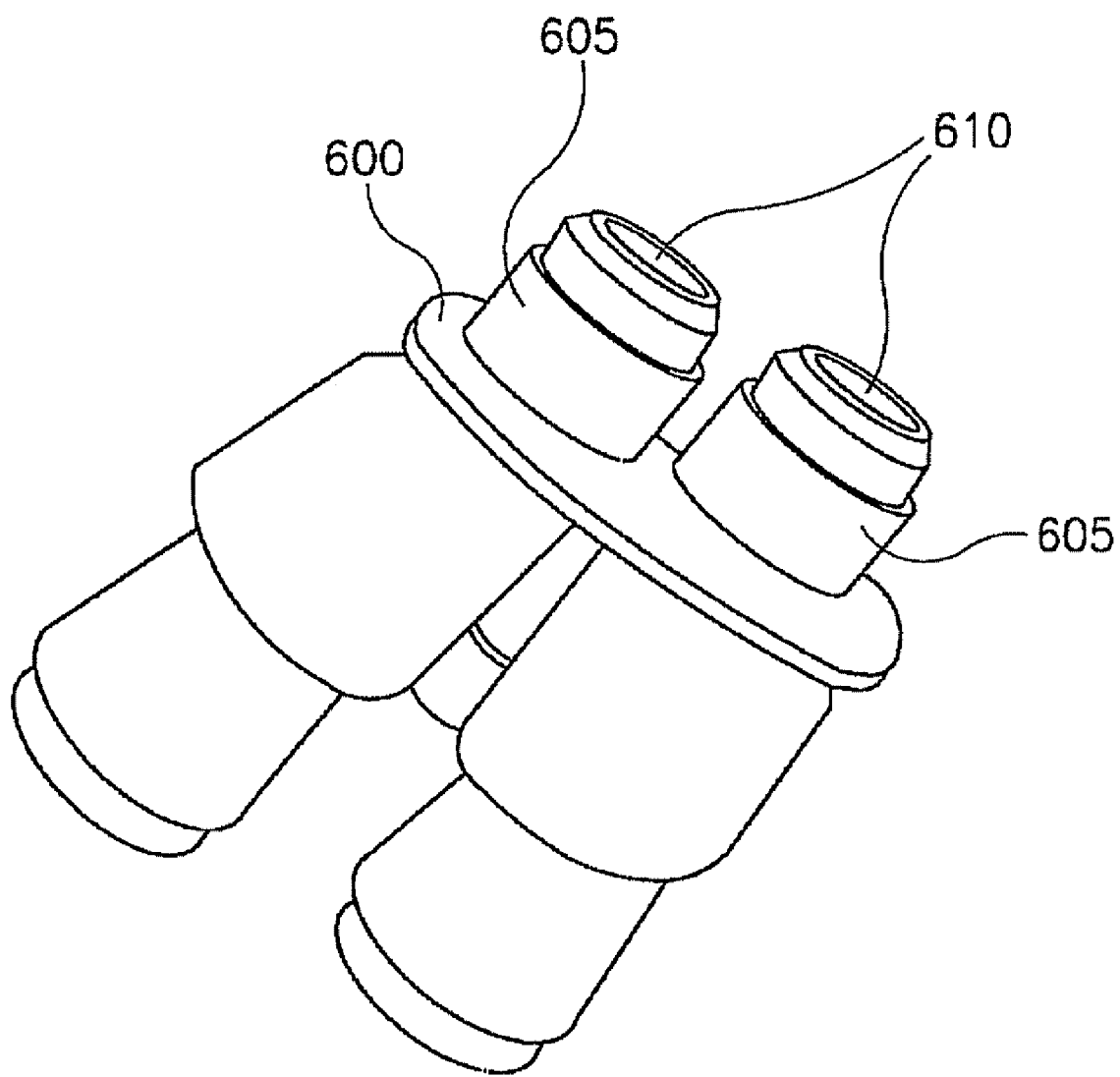
FIG. 6 is an illustration of an optical device using a higher order aberration correcting lens system according to another exemplary embodiment of the invention.

Other monocular optical devices, i.e. those with a single eyepiece, may be designed in a similar fashion as the telescope, while for an optical device with two eyepieces, e.g. binoculars, higher order aberration correcting lenses 610 may be placed in front of each eyepiece 605, as shown in the binoculars 600 of FIG. 6. Other dissociated optical devices may be used with a lens system that corrects higher order aberrations which operate in a similar manner as described with respect to the telescope and binoculars.

It should be appreciated that in any optical device, additional lenses, mirrors and other optical devices may be present within the optical device intermediate the objective lens and the eyepiece.

For many individuals, aberrations are not the same in each eye. Thus, in monocular optical devices, such as a telescope, for example, the higher order aberration-correcting lens is typically designed to correct for the eye that the individual predominantly will use to view through the device. Where the higher order aberration-correcting lens is an electro-active lens, the optical device may be programmed so that the user can indicate which eye will be used to view through the device and the appropriate prescription can be applied. For example, if an individual typically looks through a telescope with the right eye, the default setting of an electro-active higher order correcting lens may be programmed with a vision prescription that provides a pixel pattern to correct aberrations consistent with those in the right eye. However, if the individual desires to look with the left eye, he may simply flip a switch or otherwise change the pattern of the lens to provide for higher order aberration correction of the left eye.

When an optical device includes a lens system to correct for higher order aberrations, the lens system may be integrated directly into the optical device or it may be part of a removable attachment that separates from the optical device. It should be appreciated that whether or not the lens system is integrated with the optical device, the higher order aberration correcting lens may be used as the lens of the eyepiece itself rather than being used in addition to and placed between a separate eyepiece lens and the eye.

If the lens is integrated and higher order aberration correction is provided electro-actively, vision prescriptions for various individuals may be stored on an electronic storage device, such as a memory chip associated with the optical device. The memory device may be associated with a controller that relays the proper vision prescription information for a particular user to the optical device so that multiple persons may use the device.

If the higher order correcting lens is not electro-active, but is machined with a fixed prescription, the lens is preferably not integrated. Otherwise, the optical device would include a lens with a higher order correction prescription specifically created for one person and would not account for use by other individuals with different higher order aberrations that requires a different prescription. To alleviate this potential concern, the higher order correcting lens may be part of a removable attachment that separates from the optical device.

Removable lenses may permit an individual to carry her own higher order correction lens with her. For example, in a laboratory, a group of scientists may all use several different microscopes interchangeably. The scientist may have a removable lens that allows her to attach a lens designed to correct her own specific higher order aberrations to whatever microscope she is using in the lab. In this manner, she always has her ideal level of visual acuity when viewing through any one of the microscopes in the lab. Removable lens attachments may also be advantageous in manufacturing optical devices. The basic optical device can be assembled in the same way, while the attachment with the higher order correcting lens system is specially manufactured so that each different user has his or her own prescription machined or electronically programmed into the higher order aberration-correcting lens.

Figure 7A:
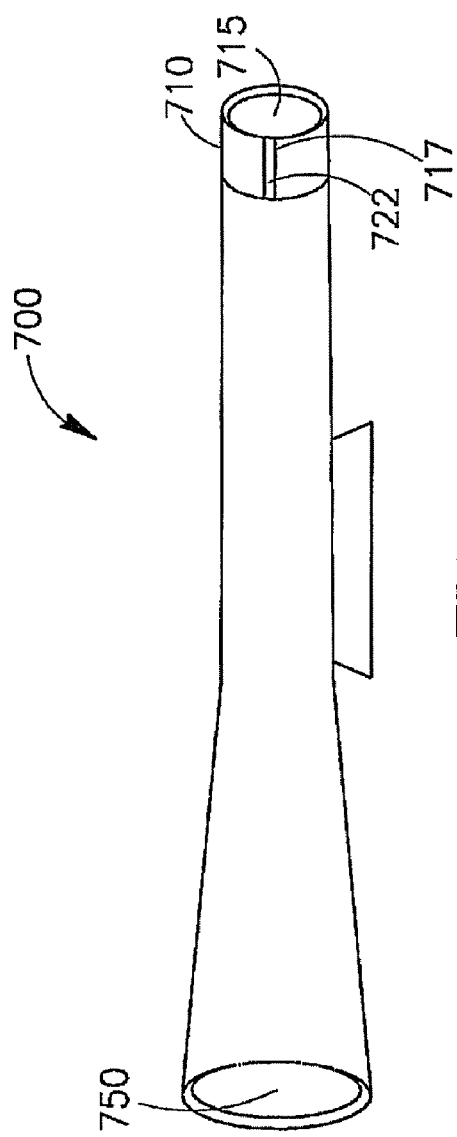
FIGS. 7a and 7b are an illustration of an optical device with a removable higher order aberration correcting lens according to an exemplary embodiment of the invention.
Figure 7B:
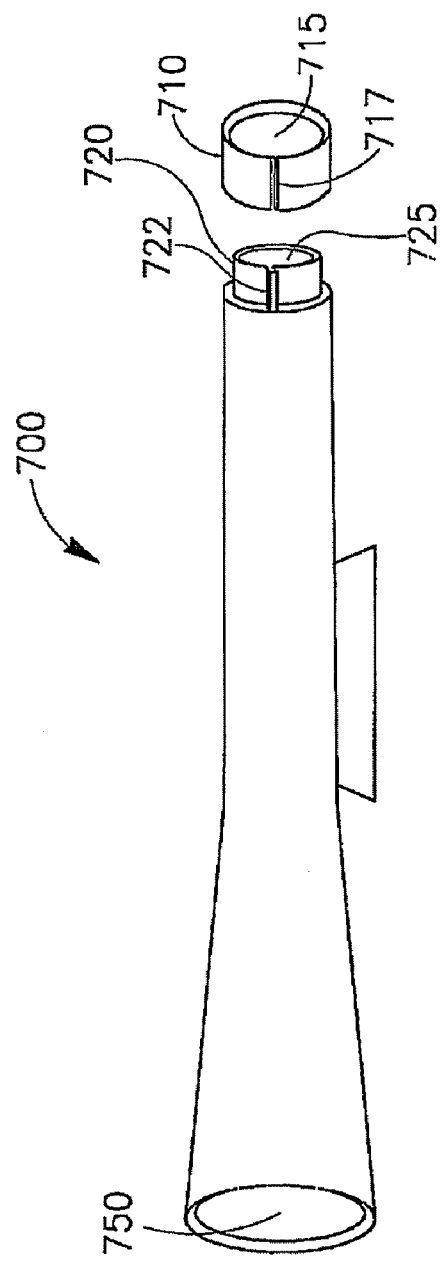
Figure 8:
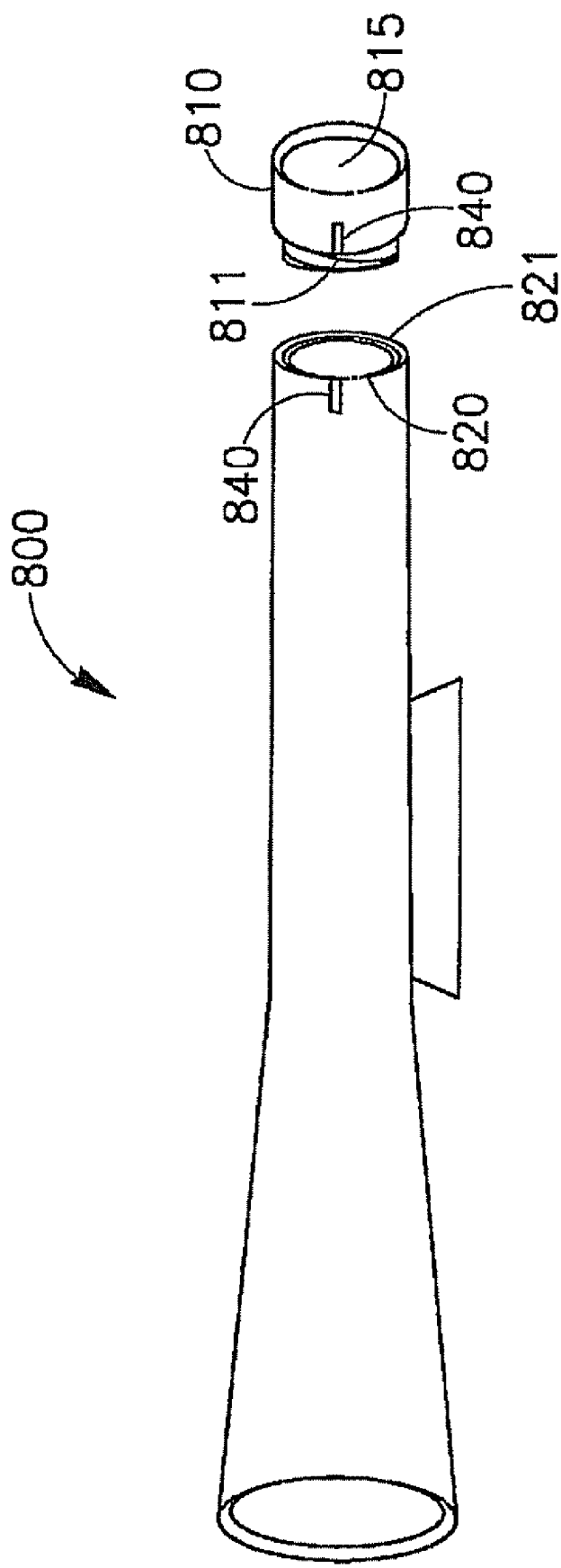
FIG. 8 is an illustration of an optical device with a removable higher order aberration correcting lens according to another exemplary embodiment of the invention.

An exemplary embodiment of how a higher order aberration correcting lens may be removably attached to an optical device is shown in FIGS. 7a and 7b illustrating a riflescope 700. An attachment 710 containing a higher order aberration-correcting lens 715 is removably attached to the riflescope 700. The attachment 710 may slide over the eyepiece 720 so that light passes through the object lens 750, through the eyepiece lens 725, and finally through the higher order aberration-correcting lens 715 before passing to a user's eye. As shown in FIG. 7b, the attachment 710 contains a channel 717 that passes over a tab 722 that projects from the eyepiece 720 of the riflescope 700. Although FIGS. 7a and 7b show the attachment 710 fitting over the eyepiece 720, it should be appreciated that the arrangement could be reversed, for example, such that the attachment fits within the eyepiece. For example, as shown in FIG. 8, the attachment 810 may have threads 811 that screw into a counter bore 821 of the eyepiece 820 of the optical device 800.

Higher order correction is typically an asymmetrical correction, thus the higher order correcting lens should not be free to rotate. Rather, the lens should have a designated top and bottom so that a user can easily attach the piece containing the higher order aberration-correcting lens to the optical device and so that the vision correcting area of the lens is properly aligned with the location of the aberrations of the eye. This may be achieved, for example, by a single tab and channel system as shown in FIG. 7b such that the higher order aberration-correcting lens can only attach to the optical device when the lens is properly aligned. Where the attachment fits within the eyepiece, such as shown in FIG. 8, the eyepiece 820 and the attachment 810 may each have a notch 840 or some other form of indicia that indicate the higher order aberration-correcting lens 815 is properly oriented when the notches 840 are aligned.

In some exemplary embodiments, it may be desirable to use a higher order aberration-correcting lens that is integrated into an optical device, particularly when the optical device is designed to provide the higher order correction electro-actively. This may have the advantage of allowing multiple persons to use the same optical device, as the electro-active prescription may be programmable and the prescription produced by the lens can be modified depending on the individual using the optical device in addition to providing dynamic changes for the user. In this case, each user does not need a separate lens attachment, but only a vision prescription electronically stored at a location that can be accessed by the optical device. Vision prescriptions for multiple persons may be stored in an electronic memory associated with the optical device, such as on a memory chip in communication with the optical device.

Figure 9:
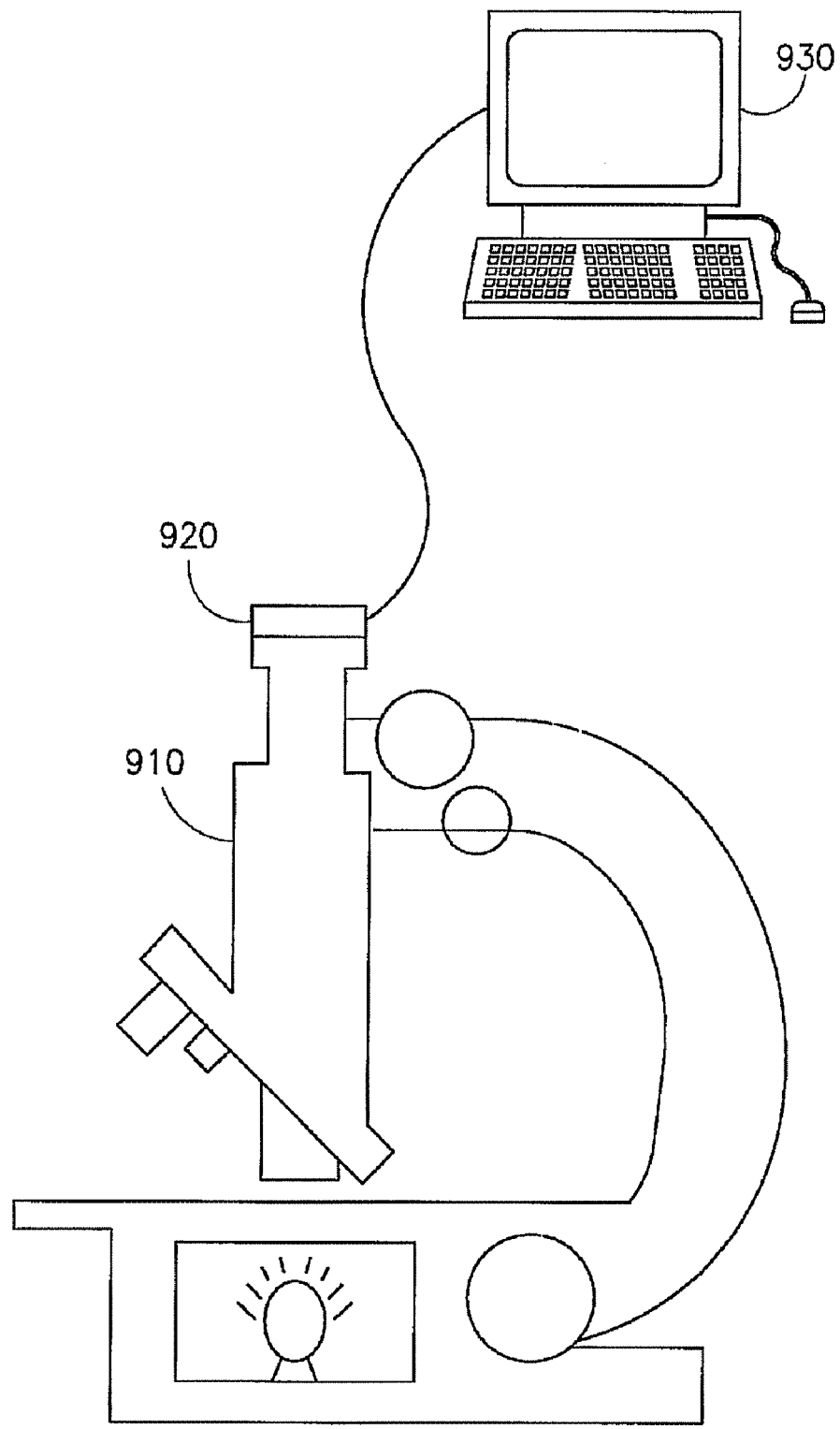
FIG. 9 is an illustration of an optical device with a programmable higher order aberration correcting lens according to an exemplary embodiment of the invention.

The individual using the optical device may identify herself as the user in some manner, such as entering a code on a keyboard or a retinal scan conducted by the optical device, by way of example only. Based on the identity conveyed to the optical device, the proper prescription or set of prescriptions for that user is available for display via the electro-active lens. FIG. 9 illustrates a microscope 910 with an integrated higher order correcting lens 920 attached to a computer 930 by which a user may enter a user id or other information to identify herself as the user of the microscope and thus direct the electro-active higher order correcting lens 920 of the microscope 910 to display the proper pixel pattern for that user's higher order vision prescription. Based on the identity of the individual, the proper pixel pattern is displayed to provide the user of the device with her own vision prescription. The vision prescriptions may be stored on a memory chip on the optical device itself or separately on a computer or other device that is associated with the optical device.

Figure 10:
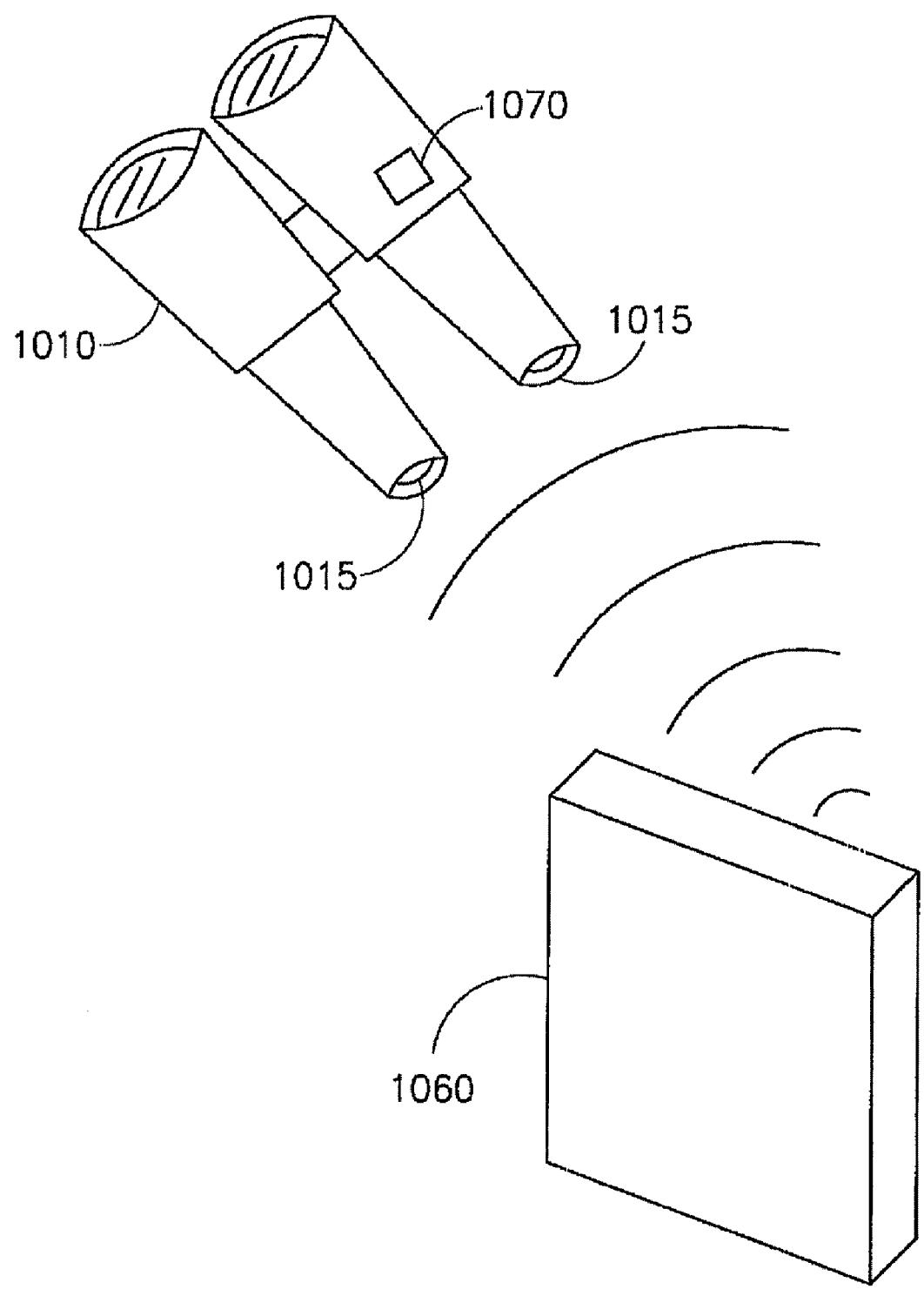
FIG. 10 is an illustration of an optical device according to an exemplary embodiment of the invention.

The computer may transmit information via a hardwire as shown in FIG. 9, or it may be a wireless transmission from a portable device as shown in FIG. 10. In FIG. 10, a night scope 1010 with electro-active higher order vision correcting lenses 1015 includes a receiver 1070 to receive a wireless transmission of data from a portable computer 1060, such as via bluetooth or RFD technology, for example.

In this manner a person could walk around with a vision prescription stored on a small computer, such as on a PDA or cellular phone, for example, that could be transmitted to any compatible electro-active device. When the person wanted to use an optical device with an electro-active lens that provides higher order aberration correction, regardless of whether the person had previously used the optical device before, the vision prescription may be transmitted from the PDA to the optical device. The optical device may then be used by the person to see through it with a prescribed improvement in visual acuity.

Unlike contact lenses or intraocular lenses, lenses that are dissociated from the eye, such as those used according to certain exemplary embodiments of the invention, don't move with the eye. As an individual looks at different objects, the individual's line of sight may change such that that the aberrations of the eye are no longer matched with the higher order correction provided by the lens, causing some loss in the enhanced visual acuity in a similar manner as described above when an attachment is not correctly aligned on the optical device. Thus, it may be desirable to provide a way to periodically assist the user to easily and quickly return to the proper line of sight. Accordingly, when higher order aberration correcting lenses are used in optical devices, a temporary or permanent guide may be used that helps the user find and maintain a proper line of sight through the lens to maintain the benefit of the enhanced visual acuity the higher order correcting lens provides.

To find and maintain the proper line of sight, the higher order correcting lens may include indicia that helps an individual see the "sweet spot" of the lens so that when the line of sight passes through that area of the lens, the best visual acuity possible with the lens is achieved. Often, the best visual acuity is maintained when the line of sight passes through the center of the lens, although this is not always the case. When the sweet spot is off center, an aid to the user to maintain the proper line of sight may be particularly advantageous.

Figure 11:
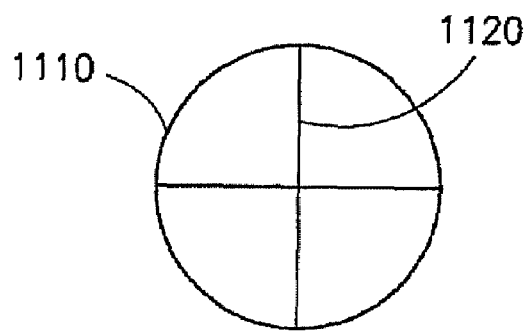
FIG. 11 is an illustration of a line of sight guide for use with an optical device according to an exemplary embodiment of the invention.
Figure 12:
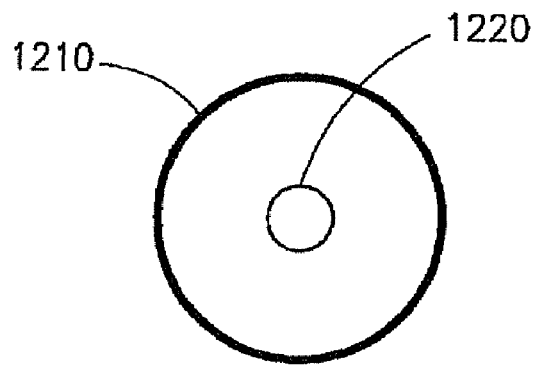
FIG. 12 is an illustration of a line of sight guide for use with an optical device according to another exemplary embodiment of the invention.

The indicia may be etched into the lens, such as the etched cross-hair shown in FIG. 11, where the cross hair 1120 represents the point of the higher order correcting lens 1110 through which the line of sight should be maintained. Additionally, if the lens is electro-active, a hue or coloration may be emitted to identify an area of contrast where the individual should direct his line of sight, as shown in FIG. 12, in which the line of sight is identified as a bulls-eye 1220 at the center of the higher order aberration-correcting lens 1210. By applying an electrical current to an electro-active material, a chromatic change can be imparted that creates the bulls-eye. Exemplary materials to impart a chromatic change include liquid crystals, conductive polymers or other known electro-chromic materials.

Figure 13:
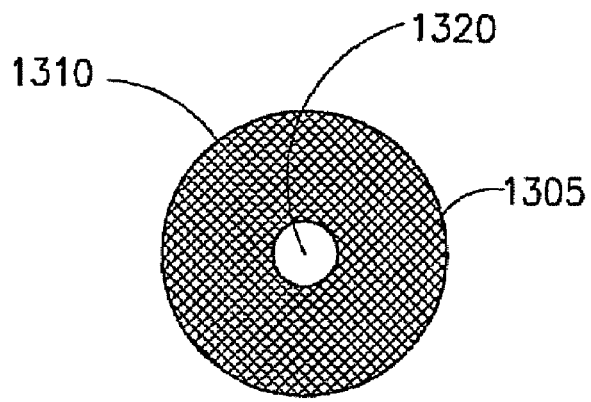
FIG. 13 is an illustration of a line of sight guide for use with an optical device according to yet another exemplary embodiment of the invention.

Yet another exemplary form of indicia for finding and maintaining a proper line of sight is the use of a template that is substantially opaque except for a pin-hole that restricts the line of sight so that the user can only see through the lens when the user is looking through the sweet spot as shown in FIG. 13. The pin-hole opening 1320 may be revealed by a physical template 1310 that slides over or attaches to the lens 1305. The opening 1320 may also be created electro-actively, for example, by producing a cross polarization between two layers of electro-active material, such that all but a small, circular portion of each of the electro-active layers are activated. The unactivated areas are in substantial registration with one another so that when the electro-active layers are in a cross-polarized state, the cross polarization filters out all light except for light that passes through the unactivated, unpolarized area that forms a pin-hole.

Where the indicia are temporary, the indicia may be removed. For example, with a pin-hole created by polarization, once the individual has determined the proper line of sight, the polarization can be removed allowing the full area of the lens for viewing. If the individual, at a later time, is concerned that his line of sight may have moved from the sweet spot, the individual may cause the indicia to re-appear and re-adjust his line of sight back to the sweet spot.

In higher order correcting lenses that are electro-active, an eyetracker may be used along with or in lieu of indicia. The eyetracker measures where the individual is looking and can thus detect where the line of sight is. By determining where the line of sight is, a controller, such as the computer that displays the appropriate pixel pattern for a particular user also adjusts that pattern to keep the eye looking through the sweet spot. For example, if an individual is originally looking straight ahead, but adjusts his line of site to look up, the eyetracker will detect this change and cause a signal to be relayed so that the controller adjusts the vision correcting pixel pattern upward to keep the pattern at the same location with respect to the eye.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes.

What is claimed:

1. A lens having an optical power, comprising:
    a sensor adapted for sensing an ambient light and producing a signal based on said sensed ambient light; and
    a controller operably connected to said sensor, wherein said controller is adapted for adjusting the optical power of the lens based on said signal from said sensor and the controller is further adapted for adjusting the optical power of the lens to one of a plurality of optical prescriptions of a wearer of the lens based upon an intensity of said ambient light.

2. The lens of claim 1, wherein said signal from said sensor varies with the intensity of said ambient light.

3. The lens of claim 1, wherein said controller is a microcontroller.

4. The lens of claim 1, wherein the lens is an electro-active lens.

5. The lens of claim 4, wherein said electro-active lens comprises a multiplicity of pixels.

6. The lens of claim 5, wherein said pixels are individually addressable.

7. The lens of claim 1, wherein said sensor is one of a photo-sensor or a photo-detector.

8. The lens of claim 1, wherein the optical power of the lens is for correcting an aberration of a wearer's eye.

9. The lens of claim 8, wherein said aberration is a higher order aberration.

* * * * *

UNITED STATES PATENT AND TRADEMARK OFFICE
CERTIFICATE OF CORRECTION

| | | |
|---|---|---|
| PATENT NO. | : 7,588,332 B2 | Page 1 of 1 |
| APPLICATION NO. | : 11/968097 | |
| DATED | : September 15, 2009 | |
| INVENTOR(S) | : Ronald D. Blum | |

It is certified that error appears in the above-identified patent and that said Letters Patent is hereby corrected as shown below:

The name of the Assignee shown in the Issue Fee Transmittal submitted to USPTO on August 5, 2009 is wrong and should be replaced with the following:

E-VISION LLC

Signed and Sealed this
Fifth Day of April, 2011

David J. Kappos
*Director of the United States Patent and Trademark Office*